May 29, 1962

G. PEREZ 3,036,474

RECORD FEED DEVICE

Filed June 16, 1960

INVENTOR
GUILLERMO PEREZ
BY
ATTORNEYS

May 29, 1962  G. PEREZ  3,036,474
RECORD FEED DEVICE

Filed June 16, 1960  2 Sheets-Sheet 2

INVENTOR
GUILLERMO PEREZ
BY Thomas S. Ross
Albert W. Scribner
ATTORNEYS

United States Patent Office 3,036,474
Patented May 29, 1962

3,036,474
RECORD FEED DEVICE
Guillermo Perez, Bristol, Conn., assignor to Royal McBee Corporation, Port Chester, N.Y., a corporation of New York
Filed June 16, 1960, Ser. No. 36,531
11 Claims. (Cl. 74—118)

This invention relates to a record feed device and more particularly relates to an improved tape feed drive for tape readers and/or punches. More specifically the invention relates to a novel actuating mechanism for intermittently power operating a drive shaft.

Many conventional intermittent types of drive units for record punches, readers and the like employ one or more solenoids for serially engaging a clutch that is operatively disposed between a mechanical power source and an output shaft. Here the solenoids are in most cases required to actuate or hold a clutch linkage which comprises several high inertia elements. This condition is tolerable where low speeds of operation are used, however such condition is particularly disadvantageous where higher cyclic speeds, compactness and a minimum number of parts are desired or required. The driving of a large number of relatively heavy machine elements will give rise to undesired vibrations and will require still larger solenoids for controlling the operation of said elements. Furthermore, as the number and/or size of the various structural elements is increased, the costs and reliability of the machine will be adversely affected as the cyclic speeds of operation thereof are increased.

One object of the instant invention is to provide an improved intermittently actuated drive apparatus which is economical to construct and operate and which is capable of high cyclic speeds of operation.

Another object of the invention is to provide a novel record feeding device which has a greatly reduced number of parts and which is very simple, compact and reliable.

Another object of the invention is to provide a novel solenoid controlled arrangement for operatively intermittently connecting an output shaft to a continuously driven member.

A further object of the invention is to provide a fast acting means for intermittently coupling a continuously oscillating power driven member to an output shaft by means of the action of a single solenoid operated arm.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
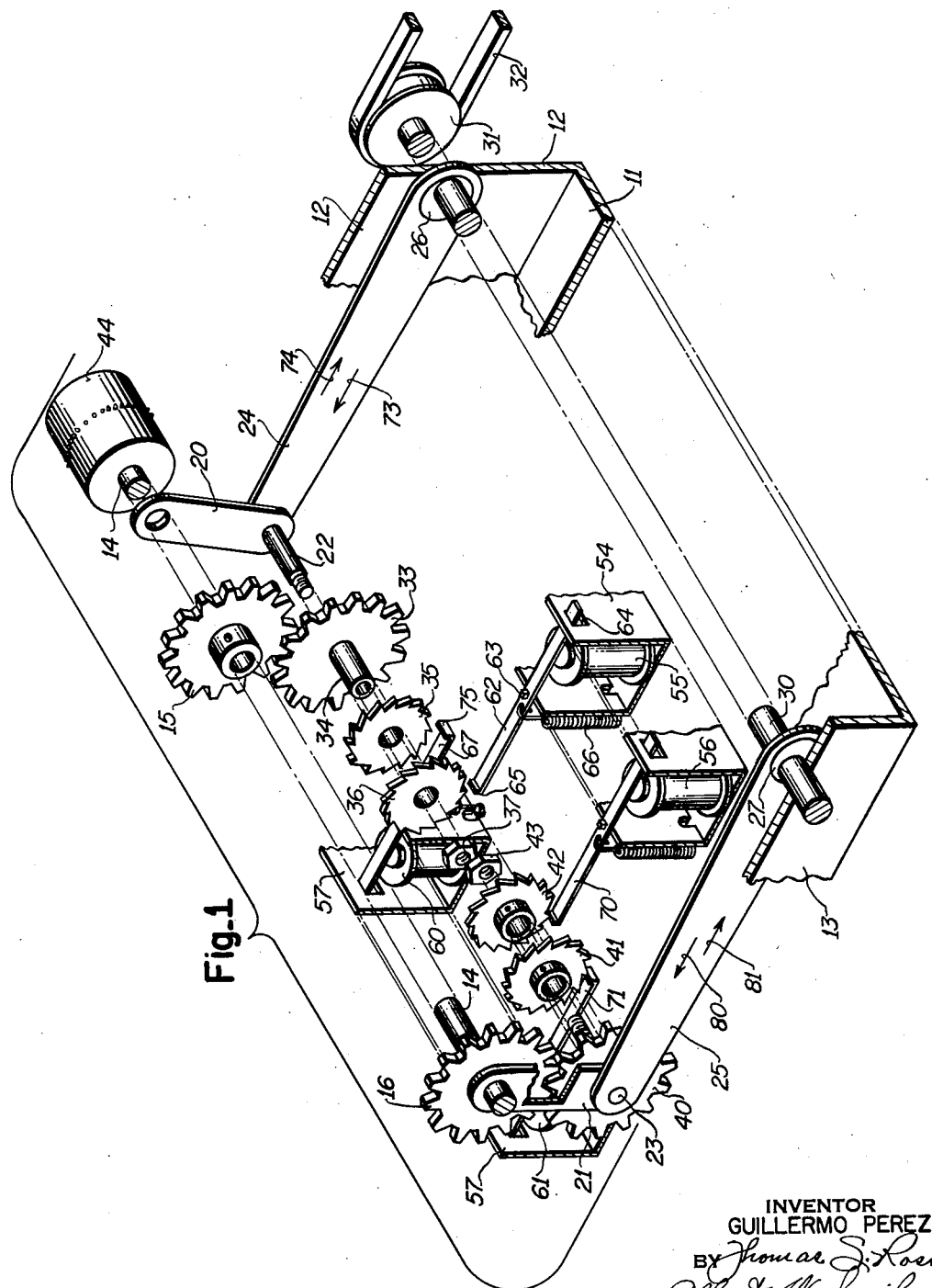
FIGURE 1 is an exploded perspective view showing the general organization of the parts of the instant apparatus.
Figure 2:
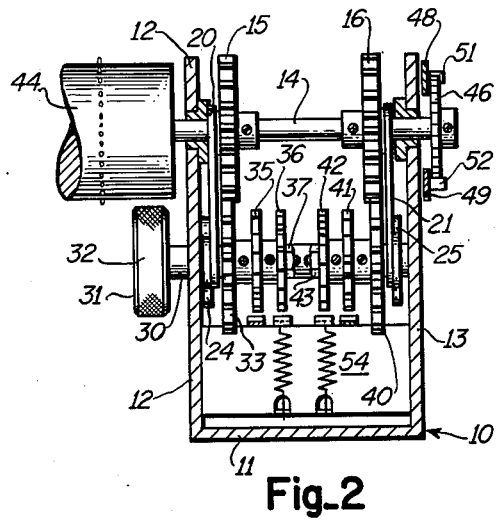
FIGURE 2 is a rear elevational view in partial section and shows a portion of the apparatus of FIGURE 1.

Referring to FIGURES 1 and 2 there is shown a frame 10 comprising a base 11 to which is fixed a pair of laterally spaced side plates 12 and 13. Rotatably mounted in the side plates is a cross shaft 14 having a pair of axially spaced gears 15 and 16 secured thereto. Pivotally mounted on shaft 14 is a pair of depending levers 20 and 21 which have inwardly extending stub shafts 22 and 23 respectively secured to the lower ends thereof. Respectively articulately connected to the shafts 22 and 23 are two crank arms 24 and 25 which are provided at their right ends, FIGURE 1, with circular apertures which respectively receive the eccentrics 26 and 27 that are fixed to a drive shaft 30 rotatably mounted in the said side plates. As is illustrated in FIGURE 1 these eccentrics are rotatably oriented so as to be 180° out of phase with one another. To one end of shaft 30 there is secured a pulley 31 which is adapted to be driven by a suitable belt 32.

Figure 3:
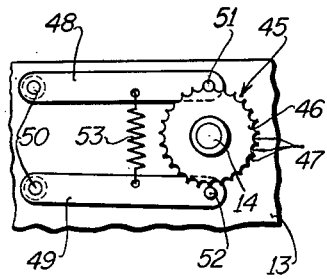
FIGURE 3 is a side elevational view showing the sprocket drum detenting means.

On the inner end of stub shaft 22 there is rotatably mounted a gear 33 which meshes with gear 15 and which has an elongated tubular hub 34. Rotatably fixed to the tubular hub 34 are two ratchet wheels 35 and 36, the teeth on wheel 35 being operatively disposed in a circumferential direction that is opposite to that of the teeth on wheel 36. A nut 37 threadedly engages the inner end of stub shaft 22 so as to axially retain the gear 33 thereon. A corresponding arrangement of gear 40, ratchet wheels 41 and 42, and nut 43 is provided on the other stub shaft 23. A detent means 45, FIG. 3, is provided for yieldably retaining the shaft 14 and the attached tape feed sprocket drum 44 in any one of several rotatively indexed positions; such means comprising a detent disc 46, FIGURES 2 and 3, which is secured to the shaft 14 and which is formed with a series of circumferential notches 47. A pair of arms 48 and 49 are pivotally mounted, as at 50, to the side frame 13 and respectively extend to the upper and lower peripheral edges of said detent disc. These arms are provided with laterally extending studs 51 and 52 that are adapted to alternately seat in the notches 47 of the disc 46 under the yieldable action of a spring 53 that is operatively connected between said arms 48 and 49.

Just forwardly, FIGURE 1, of the four ratchet wheels, and fixedly mounted between the side plates 12 and 13 is a first U-shaped bracket 54 which operatively supports a pair of laterally spaced drive control solenoids 55 and 56 that are respectively associated with the ratchet wheels 36 and 42. A second U-shaped bracket 57 disposed to the rear of said ratchet wheels is secured between said side plates and operatively supports another pair of drive control solenoids 60 and 61, FIGURE 1, that are respectively associated with ratchet wheels 35 and 41. Immediately above solenoid 55 there is provided an armature 62 which is formed with a suitable aperture that is adapted to receive the vertical projection 63 on the rearward vertical leg of bracket 54 and which has a forward or right end, FIGURE 1, that extends through a slot 64 formed in the forward vertical leg of said bracket. The rearward or inner end of armature 62 is formed with a bent off nose 65 which is normally disposed just below the lower teeth of ratchet wheel 36. The limits of the permitted swinging movement of armature 62 are determined by the engagement of the said right end thereof with the respective upper and lower ends of said notch 64; the normal counterclockwise position, FIGURE 1, of the armature being yieldably maintained by the action of a spring 66 that is anchored to the bottom of the U-shaped bracket 54. A corresponding arrangement is provided for the three armatures 67, 70 and 71 which are respectively associated with the three solenoids 60, 56 and 61 and which respectively cooperate with the three ratchet wheels 35, 42 and 41.

Figure 4:
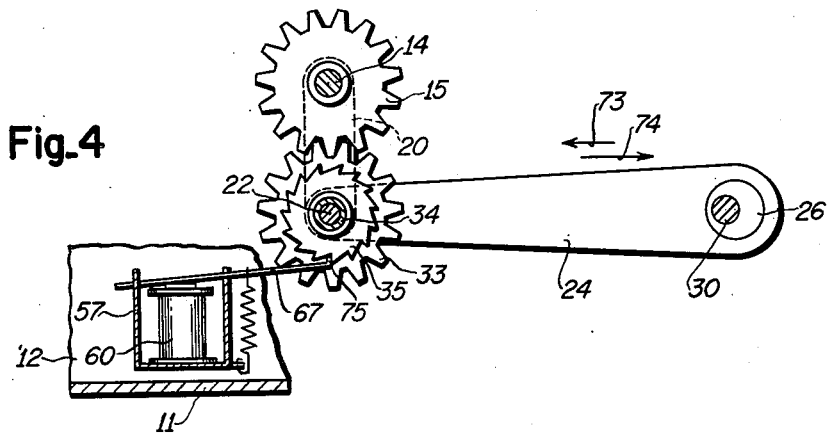
FIGURES 4 and 5 are vertical side elevational views in partial section showing the active conditions of one of the drive control units of the apparatus of FIGURE 1.
Figure 5:
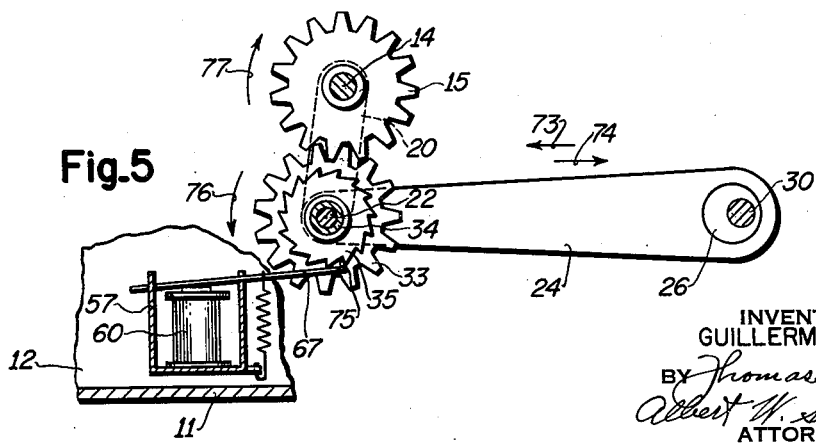

In that each solenoid arrangement cooperates with the associated ratchet wheel in similar fashion a detailed consideration of the mode of operation of one such arrangement or drive control unit will suffice here. The operation of the tape feed device when controlled by the solenoid 60 and ratchet wheel 35 will be explained with reference to FIGURES 1, 4 and 5. The drive shaft 30 is continuously driven so that the eccentric 26 will cyclically actuate crank arm 24 through successive cycles each comprising a relatively short rearward stroke 73 and a corresponding forward stroke 74; said strokes being uniform in magnitude. This cyclic action serves to arcuately oscillate the link 20 and gear 33 about the axis of shaft 14. As long as the nose 75 of armature 67 remains below the teeth of ratchet 35 the gear 33 will be free to normally idly rotate about stub shaft 22 as it rolls around the lower portions of gear 15, the yieldable detent means 45 at this time holding the shaft 14 and the tape feed sprocket drum 44 in a rotatably stationary position. Here the gear 33 will idly rotate in a clockwise direction FIGURE 1, during the rearward stroke 73 or first half cycle of the crank arm 24 and will idly rotate in a counterclockwise direction during the forward stroke 74 or last half cycle of the crank arm. When the solenoid 60 is energized the armature 67 will be rocked in a counterclockwise direction, FIGURE 4, so that the armature nose 75 is moved into the path of travel of the flat faces of the teeth of the ratchet wheel 35. Here then, during the rearward stroke 73 of the crank arm, the ratchet wheel and hence the attached gear 33 will not be free to normally idly rotate or roll as above described but rather will tend to rock about the armature nose 75 so that the gear 33 will now be forced to rotate in a counterclockwise direction 76 about its own axis during said stroke 73 as illustrated in FIGURE 5. This action will serve to rotatably drive the gear 15 and the tape feed sprocket drum 44 through a short forward rotative displacement as indicated by arrow 77, FIGURE 5, to the next detented position for the shaft 14 as determined by the yieldably detent means 45. During the subsequent forward stroke 74 of the crank arm the ratchet wheel teeth are "ratcheted" back over the armature nose 67, this action however not generating sufficient torque to rotatably displace the shaft 14 from its newly detented rotative position. The solenoid 60 is deenergized during said forward stroke 74 or second half cycle so that at the end of these two strokes 73, 74 a new cyclic operation may commence with the solenoid being either energized or not energized depending on whether or not a rotative stepping movement of the tape feed sprocket drum 44 is desired at this time. The other solenoids 55, 56 and 61 and associated armatures 62, 70 and 71 respectively cooperate with their related ratchet wheels 36, 42 and 41 in a manner similar to that just described for solenoid 60, armature 67 and ratchet wheel 35 except that in the latter cases the timing or the possible points of initiating the respective operation thereof may slightly differ, as will be explained below, in order to modify the direction and/or speed of the incremental rotative stepping movement imparted to the shaft 14 and sprocket drum 44.

If it is desired to double the speed of the forward or clockwise travel of the output shaft 14 during each cyclic operation of crank arm 24 then a second incremental or stepping rotative movement of the sprocket drum 44 may be effected during the stroke 74 of the last half of said cyclic operation as well as during the stroke 73 of the first half of the cycle. Here it will be recalled that the eccentric 27 is 180° out of phase with respect to the eccentric 26, so that as crank arm 24 partakes of its forward stroke 74 crank arm 25 will simultaneously partake of its rearward stroke 80, FIGURE 1. Here if the solenoid 61 is energized at the beginning of the simultaneous strokes 74 and 80 then the associated ratchet wheel 41, which has teeth operatively disposed in the same rotative direction as that for the ratchet wheel 35, will cause a second incremental rotational stepping movement during the said second half of the cyclic operation. In this event there will be two incremental displacements of shaft 14 for each cyclically operating revolution of shaft 30 and hence the intermittent feed movement of drum 44 will be doubled as compared to the case where only solenoid 60 is serially energized.

If it is desired to intermittently drive the output shaft 14 at a relatively slow speed in a reverse direction i.e. in a counterclockwise direction as seen in FIGURE 5, then neither control solenoids 60 or 61 is energized, rather the solenoid 55 is energized so that the armature 62 cooperates with the ratchet wheel 36 which has teeth that are disposed in an operative rotative direction opposite to that for the teeth of ratchet wheel 35. Here then if the solenoid 55 is energized at the beginning of stroke 74 of the crank arm 24 the shaft 14 will be rotatably indexed in a counterclockwise or reverse direction, FIGURE 1, upon execution of said stroke 74. Here a ratcheting non-driving action will occur during stroke 73. If it is desired to double the speed of this reverse indexing movement of the shaft 14 then a drive action may be obtained during the stroke 73 by energizing the solenoid 56 which cooperates with the ratchet wheel 42 that has teeth operatively disposed in a rotative direction which is the same as that for said ratchet wheel 36. Here if the solenoid 56 is energized at the beginning of the simultaneous but opposed strokes 73 and 81 then the shaft 14 will be indexed through a second reverse step immediately after completion of the first reverse step. Thus for each revolution of shaft 30 two reverse stepping movements may be imparted to shaft 14 and hence the speed of its reverse intermittent movement may in this way be doubled.

As will be readily appreciated, each time that the output shaft 14 is to be temporarily operatively coupled to the drive shaft 30 only one light element i.e. a solenoid armature, need be displaced by energization of the associated solenoid. This makes the "triggering" of the tape feed drive mechanism very fast acting and reliably efficient.

While there is in this application specifically described one form which the invention may assume in practice, it will be understood that this form of the same is shown for purposes of illustration only and that the invention may be modified and embodied in various other forms without departing from its spirit or the scope of the appended claims.

The invention claimed is:

1. An intermittent drive mechanism; comprising a frame, an output shaft rotatably mounted on said frame, a first gear drivingly connected to said output shaft, a second gear disposed in meshing relation with said first gear, supporting means mounting said second gear for rotational movement about its geometric axis and for swinging movement about a portion of the periphery of said first gear, drive means for actuating said supporting means so that said second gear partakes of a normal rolling motion back and forth along a predetermined portion of the periphery of said first gear and in a non-driving relationship with respect to said first gear, means operable to interrupt said normal rolling movement of said second gear so that said second gear during its said swinging movement rotatably drives said first gear and said output shaft through a predetermined angular distance, said last mentioned means comprising a ratchet wheel mounted for swinging and rotative movement with said second gear, and detent means mounted on said frame and having an element which is movable into and out of the path of movement of the teeth of said ratchet wheel.

2. Apparatus as defined by claim 1 wherein said second gear is rotatably mounted on a link that is pivotally connected to said output shaft, and wherein said drive means comprises an eccentrically actuated crank arm that is articulately connected to said link.

3. Apparatus as defined by claim 2; additionally comprising yieldable detent means on said frame for preventing random rotative movement of said output shaft.

4. Apparatus as defined by claim 1; additionally comprising a second ratchet wheel mounted for swinging and rotative movement with said second gear, the operative circumferential direction of orientation of the teeth of said second ratchet wheel being opposite to that for the first mentioned ratchet wheel, and a second detent means having an element which is movable into and out of the path of movement of the teeth of said second ratchet wheel.

5. An intermittent feed mechanism; comprising a frame, an output shaft rotatably mounted on said frame, detent means for yieldably retaining said shaft in a succession of predetermined rotative positions, a first gear rotatably secured to said shaft, a second gear adapted to mesh with said first gear, means for supporting said second gear for rotation about its own geometric axis and for swinging movement about a predetermined portion of the periphery of said first gear, a ratchet wheel secured to said second gear, means for continuously oscillating the supporting means for said second gear so as to thereby normally cyclically and oscillatably roll said second gear about a portion of the periphery of said first gear in non-driving relation with respect to the latter, and a solenoid mounted on said frame and having an armature movable into and out of the path of movement of the teeth of said ratchet wheel so as to respectively interrupt and permit the said normal rolling movement of said second gear and thereby respectively cause said output shaft to be forwardly rotatably displaced a predetermined extent and to be yieldably retained substantially stationary during one half of a cyclic oscillatory swinging movement of said second gear.

6. Apparatus as defined by claim 5; additionally comprising a second ratchet wheel mounted for swinging and rotative movement with said second gear, the operative circumferential direction of orientation of the teeth of said second ratchet wheel being opposite to that for the first mentioned ratchet wheel, and a second solenoid mounted on said frame and having an armature which is movable into and out of the path of movement of the teeth of said second ratchet wheel so as to respectively permit and prevent the driving of said ouput shaft in a reverse direction during one half of a cyclic oscillatory swinging movement of said second gear.

7. Apparatus as defined by claim 5; additionally comprising additional similar gear and ratchet means operable to intermittently actuate said output shaft in a forward rotative direction, power operated means for driving said additional gear and ratchet means in 180° phase relationship with respect to the oscillatory movement of said second gear and its associated ratchet wheel, and solenoid controlled means for selectively enabling and disabling the driving action of said additional gear and ratchet means, said solenoid controlled means being operable so as to permit or prevent the driving of said output shaft during the other half of said cyclic oscillatory swinging movement of said second gear.

8. Apparatus as defined by claim 6; additionally comprising additional similar gear and ratchet means for intermittently actuating said output shaft in said reverse direction, power operated means for driving said additional gear and ratchet means in 180° phase relationship with respect to the oscillatory movement of said second gear and its associated ratchet wheel, and solenoid controlled means for selectively enabling and disabling the last mentioned additional gear and ratchet means, the last mentioned solenoid controlled means being operable to permit or prevent the driving of said output shaft during said other half of the cyclic oscillatory swinging movement of said second gear.

9. An intermittent feed mechanism; comprising a frame, an output shaft rotatably mounted in said frame, a first gear rotatably secured to said shaft, a link pivotally mounted on said shaft, a gear shaft mounted on said link, a second gear rotatably mounted on said gear shaft and adapted to mesh with and to swing about a predetermined portion of the periphery of said first gear so that said second gear normally rolls about said portion of the periphery of said first gear in non-driving relation therewith, a drive shaft rotatably mounted in said frame, crank means operatively connected between said drive shaft and said link, a ratchet wheel connected for movement with said second gear, and a solenoid mounted on said frame and having an armature which is adapted to be moved into and out of the path of travel of the teeth on said ratchet wheel so that when said second gear is oscillatably swung by the driven crank means said output shaft will be respectively driven and prevented from being driven by said second gear.

10. Apparatus as defined by claim 9; additionally comprising a second ratchet wheel connected to said second gear, the teeth on the respective ratchet wheels being operatively disposed in opposite rotative directions, and a second solenoid mounted on said frame and having an armature that is adapted to be moved into and out of the path of travel of the teeth of said second ratchet wheel.

11. Apparatus as defined by claim 9; additionally comprising a third gear rotatably secured to said output shaft, a fourth gear operatively supported to mesh with and to roll around the periphery of said third gear, a second ratchet wheel connected to said fourth gear, and a second solenoid mounted on said frame and having an armature adapted to be moved into and out of the path of travel of the teeth on said second ratchet wheel, the teeth on said ratchet wheels being operatively disposed in the same rotative direction.

References Cited in the file of this patent

UNITED STATES PATENTS

| | | |
|---|---|---|
| 869,329 | Prouty | Oct. 29, 1907 |
| 1,223,339 | Herrmann et al. | Apr. 17, 1917 |
| 1,241,015 | Peterson | Sept. 25, 1917 |
| 1,393,219 | Hohl | Oct. 11, 1921 |
| 2,339,404 | Hibbard | Jan. 18, 1944 |
| 2,407,840 | Leonard | Sept. 17, 1946 |
| 2,511,349 | Klay | June 13, 1950 |
| 2,633,733 | Frederick | Apr. 7, 1953 |
| 2,858,719 | Hautau | Nov. 4, 1958 |

FOREIGN PATENTS

| | | |
|---|---|---|
| 430,784 | Great Britain | June 25, 1935 |
| 924,021 | France | Mar. 3, 1947 |
| 126,652 | Sweden | Nov. 8, 1949 |

OTHER REFERENCES

"Design in Action," published by Machine Design U.S.A., January 7, 1960 (pp. 136–137 relied on). Copy in Division 12.